United States Patent
Knapp

[19]
[11] Patent Number: 5,904,291
[45] Date of Patent: May 18, 1999

[54] THERMOSTATIC FAUCET MIXING VALVE

[75] Inventor: Alfons Knapp, Klockstr, Germany

[73] Assignee: Masco Corporation, Taylor, Mich.

[21] Appl. No.: 08/952,287

[22] PCT Filed: May 9, 1996

[86] PCT No.: PCT/US96/06573
§ 371 Date: Nov. 10, 1997
§ 102(e) Date: Nov. 10, 1997

[87] PCT Pub. No.: WO96/35984
PCT Pub. Date: Nov. 14, 1996

[30] Foreign Application Priority Data

May 10, 1995 [IT] Italy .................................. T095A0364

[51] Int. Cl.⁶ .................................................. G05D 23/13
[52] U.S. Cl. ............................................ 236/12.14; 137/88
[58] Field of Search ................................ 236/12.14, 12.1; 137/88

[56] References Cited

U.S. PATENT DOCUMENTS 1,927,054  9/1933  Williams .
2,296,128  9/1942  Weingarten ......................... 236/12.14
2,326,096  8/1943  Dillman .
2,535,893  12/1950  Branson ............................. 236/12.14
2,647,692  4/1953  Keller .
2,791,379  5/1957  Dew .
2,910,242  10/1959  Freismuth et al. .
3,007,644  11/1961  Drummond .
4,475,684  10/1984  Garlick et al. .

FOREIGN PATENT DOCUMENTS 29 17 233 A1  11/1979  Germany .

*Primary Examiner*—William E. Tapolcai
*Attorney, Agent, or Firm*—Reising, Ethington, et al

[57] ABSTRACT

A thermostatic regulator (30) for a single handle mixer valve (12) has a sensor (32) mounted in a mixed water chamber (34) for sensing the temperature of the outlet water. The sensor is connected to a valve (20) that is mounted in the cold water supply line (18) to restrict the availability of cold water when the water in the hot water line (16) is down below a set temperature.

8 Claims, 3 Drawing Sheets

THERMOSTATIC FAUCET MIXING VALVE

TECHNICAL FIELD

The field of this invention relates to thermostatic mixing devices and more particularly a thermostatic faucet mixing valve.

BACKGROUND OF THE DISCLOSURE

Many faucets have devices that control the temperature of the mixed output flow from hot and cold water supplies. One reason for thermostatic control is to eliminate constant readjustment of the valve when the temperature of the hot water supply fluctuates. The temperature of the hot water supply may vary substantially. The initial temperature of the hot water supply within the supply conduits may be cool after long periods of faucet inactivity particularly if the hot water tank is far from the faucet and the pipeline leading from the hot water tank to the faucet is long. Furthermore, if the hot water heater is being taxed to capacity and cannot keep up and the hot water tank is running out of hot water, the hot water supply may substantially cool down over a relatively short period of time.

Most known thermostatic faucet mixing valves work by changing the flow rates of both the hot and cold water simultaneously in opposite directions so as to keep the temperature of the mixed outlet water approximately constant within certain limits. The impetus of providing simultaneously lowering and increasing flow rates of the respective hot and cold water supplies and vice versa is to provide for a near constant flow rate during the thermostatic adjustments.

Many of these types of thermostatic mixing valves use the thermostatic element to determine a relatively narrow range of temperature allowed for the mixed outlet water and incorporate the thermostatic device into the mixing control. To adjust the temperature of the outflow, one adjusts the specialized mixing mechanism that incorporates the thermostatic element. Total flow rate then needs to be controlled by another mechanism. The inclusion of two separate mechanisms, one for controlling total flow rate and the other for controlling mix that incorporates the thermostatic element, adds needless expense and complexity to thermostatic faucets that lower their commercial desirability.

Another disadvantage of these known thermostatic devices becomes apparent when the hot water supply is received from an instantaneous hot water heater. Known instantaneous water heaters have a safety device that interrupts the heating in case the flow of water running through them becomes less than a certain predetermined limit. Known thermostatic control devices are able to reduce the flow rate from the hot water supply to below this limit, thus causing the water heater to shut off.

One known thermostatic device disclosed in German Patent 2,917,233 includes a thermostatic regulator that reduces the flow of the hot water supply when the temperature of the mixed water output exceeds a set value. In this case, due to the action of the thermostatic regulator, the flow of the cold and hot water supply is not simultaneously and oppositely controlled. Instead, while the hot water supply flow is controllably adjusted, the cold water flow remains relatively constant. However, when the hot water is supplied from an instant water heater, the same above mentioned disadvantage occurs.

What is needed is a thermostatic device that allows a standard mixing valve to function in both the flow rate and mixing mode while still providing a thermostatic control. Furthermore what is needed is a thermostatic device that does not cause deactivation of an instant water heater due to the thermostatic regulation on the water supplies such that the thermostatic faucet mixing valve is compatible with instant water heaters.

SUMMARY OF THE DISCLOSURE

In accordance with one aspect of the invention, a thermostatic faucet has a mechanical mixer valve having a first cold water supply conduit, a hot water supply conduit, and a mixed water outlet conduit. The faucet includes a thermostatic regulator having a sensor element mounted in the mixed water outlet conduit and a control valve operably connected to the sensor. The control valve is constructed to modify the flow of only the cold water supply when the temperature of the mixed water tends to become higher than a set value. Preferably, the control valve is mounted directly within the first cold water supply conduit such that the thermostatic regulator restricts the flow of only the cold water that is provided to the mechanical mixer valve when the temperature of the mixed water becomes lower than a set value as sensed by the sensor element.

The flow of hot water drawn remains constant and depends only on the regulation of the total flow and of the mixing ratio, as predetermined by the user as set with the single handle mixer. Only the flow of the drawn cold water varies so as to keep the temperature of the mixed water within certain preset limits. Because the regulation performed by the operator is compatible with the operation of instant hot water heaters, the thermostatic regulation of the faucet valve does not disturb the operation of the instant water heater.

In one embodiment, the control valve has a full open position that provides for full flow through the cold water conduit with the sensor element being constructed and connected to the control valve such that the control valve restricts flow through the cold water conduit when the temperature in the mixed water is below the set value.

In one embodiment, the control valve is constructed to completely close off a first cold water supply conduit. A second cold water supply conduit is in parallel with the first cold water supply that continuously supplies a restricted flow of cold water directly to the single handle mixer valve.

In another embodiment, the control valve is constructed to provide a continuous restricted flow of the cold water and not completely shut off cold water flow to the mechanical mixer in the absence of action by the sensor element. The control valve has at least one passage of restricted area that allows continuous restricted flow rate of the cold water through the control valve and to the mechanical mixer valve.

It is also desirable that the thermostatic regulator has a manual control to permit manual modification of the set temperature that the control valve restricts flow through the first cold water conduit.

In this fashion, a thermostatic valve is compatible with both instant hot water heaters and with conventional mechanical mixer valves to provide the advantages of both manual setting of the mixed output water and providing thermostatic control of the output mixed water.

BRIEF DESCRIPTION OF THE DRAWINGS

Reference now is made to the accompanying drawings in which.

DETAILED DESCRIPTION OF THE PREFERRED EMBODIMENT

Figure 1:
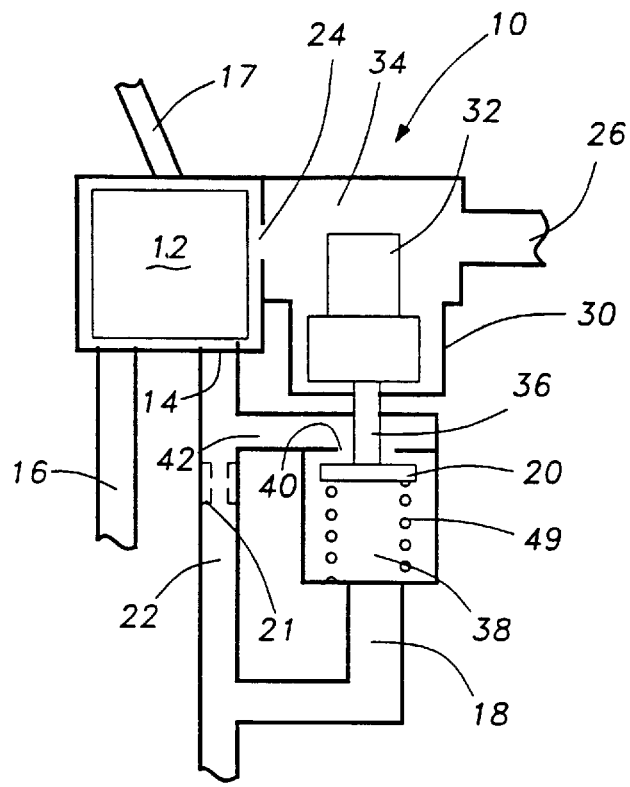
FIG. 1 is a basic schematic view of one embodiment in accordance with the invention.
Figure 5:
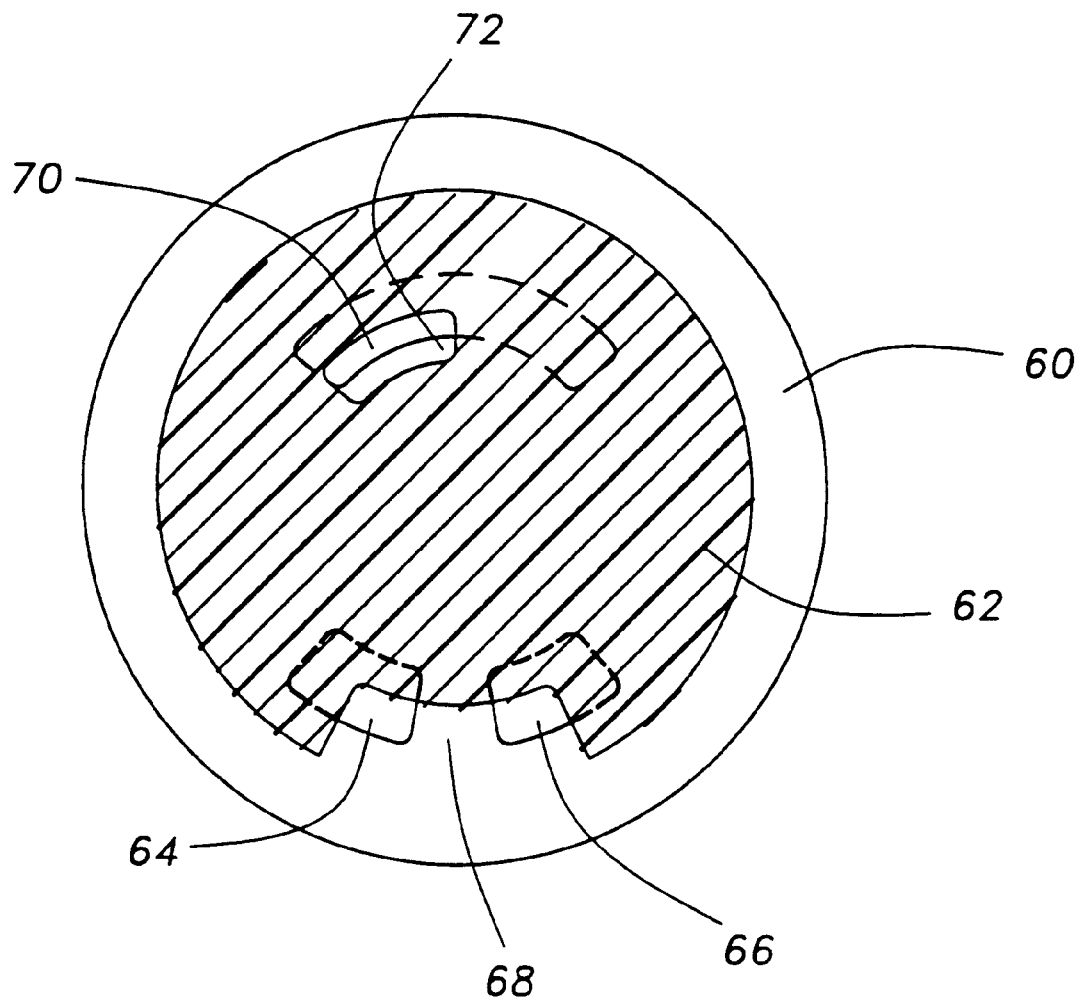
FIG. 5 is a schematic plan view of valve plates found in the mixer valve.

Referring now to FIG. 1, a thermostatic faucet 10 includes a single handle mixer valve 12 operably connected to a cold water supply inlet 14 and a hot water supply conduit 16. The mechanical mixer can be of any conventional commercially available mixer valve. Preferably, it is a single handle mixer cartridge with a single control lever 17 and which can have ceramic disk elements as shown in FIG. 5 and described later.

The hot water supply inlet 16 is directly linked to the mixer valve 12. The hot water can come from any source such as an instant gas or electric water heater. Cold water supply inlet 14 is connected to a first cold water conduit 18 that contains a thermostatically controlled valve 20. A second cold water supply line 22 is parallel to line 18 and bypasses the control valve 20. A flow restrictor 21 is positioned within line 22. Naturally, the two supply lines 18 and 22 can be rejoined upstream and derive its water from a common source.

The mixer valve 12 has its mixed water outlet 24 connected to conduit 26. A thermostatic regulator 30 has a temperature sensor 32 mounted in a chamber 34 of the mixed water conduit 26. The sensor 32 can be a commercially available wax dilation bulb of the well known type. A drive rod 36 is connected to the sensor 32 and exits the chamber 34 in well known manner with proper sealing against water leakage. The sensor 32 moves the rod 36 as a function of the sensed temperature of the mixed water within chamber 34.

The drive rod 36 is connected to the control valve 20 that is housed in a chamber 38 in line with conduit 18. The valve 20 cooperates with a corresponding seat 40 interposed between chamber 14 and pipeline 42 that connects to inlet 14.

Figure 2:
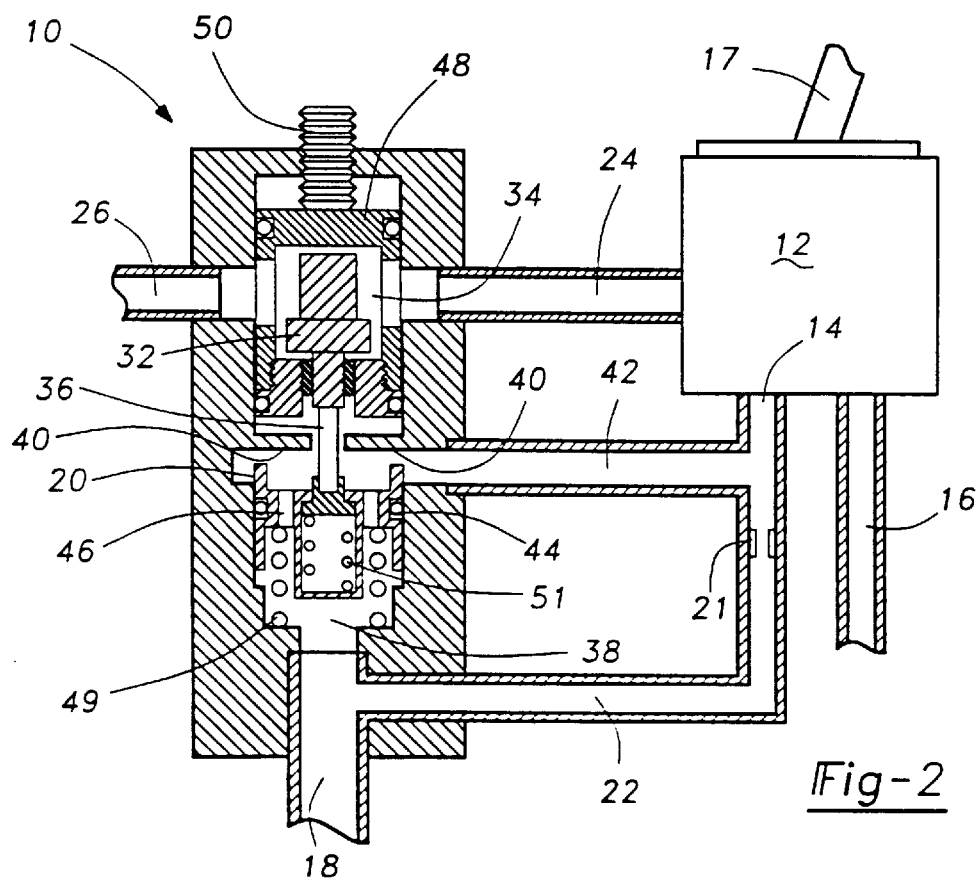
FIG. 2 is a side segmented view of a thermostatic faucet device using the schematic shown in FIG. 1.

As shown in FIG. 2, the valve 20 is a slide valve with seals 44 abutting the walls of chamber 38 and flow apertures 46 passing through the central portion of the valve. The valve 20 cooperates with the seat 40 so that flow is completely shut off when the valve is in the closed position. The thermostatic sensor 32 can be mounted in a slide 48 arranged to slide within chamber 34. The position of the slide 48 can be controlled by a screw control 50. The screw control 50 regulates and modifies the action of the thermostatic regulator 10 and in particular, one can limit the maximum temperature that can be obtained under normal operating conditions.

The regulator 30 may incorporate a safety spring 51 that is attached to the slide valve 20 for the purpose of preventing excessive stresses from being applied to sensor element 32 under certain conditions. The purpose is itself well known with respect to thermostatic regulators. A return spring 49 is placed within chamber 38 to assist the valve 20 to its closed position.

The operation of the mixer valve 12 is conventionally conducted via control lever 17. The temperature and flow rate are selected by a positioning the control lever to a particular position. The demand of hot water is selected by the setting of the mixer valve 12. The flow of cold water however is restricted because valve 20 is closed. The choke 21 also restricts the flow of cold water supply available to the mixer valve 17. The bypass line 22 for cold water supply is necessary if the user desires to draw only cold water.

As the hot water supply is drawn from pipe 16 which may initially be only room temperature or luke warm, the water is drawn from the instant hot water heater (not shown) and the water passing to the faucet mixer valve 12 from pipe 16 becomes fully heated. The temperature of the mixed water that runs through chamber 34 increases. The temperature of the sensor 32 also rises so that once a certain temperature threshold is crossed, the sensor causes valve 20 to open with respect to seat 40 and allow increased availability of cold water to mixer valve 12. Consequently, increased availability of cold water allows more cold water to pass through mixer 12 and to conduit 24 and to chamber 34. A condition of equilibrium is reached and the temperature and the flow rate of the mixed water are set by the user with mixer valve 12.

The thermostatic regulator allows the operator to preset the mixer valve to the desired temperature upon the initial operation of the faucet. The faucet provides that full flow of the hot water supply is initially drawn while only a restricted flow of cold water is mixed with the hot water supply. When the hot water actually arrives, the thermostatic regulator permits an increased flow of cold water which is an obvious indication that the normal equilibrium flow conditions have been reached.

The thermostatic regulator eliminates the previous inconvenient habit of the user opening the faucet hot water supply each time he uses the faucet, then waiting for the increase in temperature, and then adjusting the temperature mix after the hot water supply has reached the normal heated temperatures.

If during water flow through the mixer valve 12 and thermostatic regulator 10, the supply conditions change such as a depletion of hot water, a lowering of the temperature of the hot water, or an unexpected temporary drop in the cold water incoming pressure, the thermostatic regulator 30 immediately corrects the opening in of valve 20 so as to modify the cold water flow available to the mixer valve 12 and to keep the temperature of the drawn mixed water within outflow chamber 34 constant within the limits of the sensor's sensitivity. The compensation from a drop of pressure in the cold water supply is important because it is most commonly the cold water supply that is subject to these variations due to the operation of direct flush toilet valves, dishwashers, and washing machines.

Figure 3:
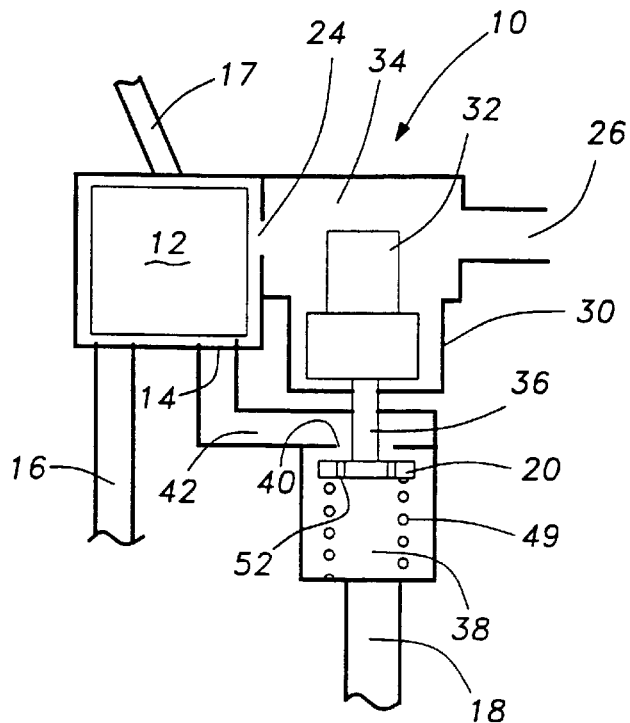
FIG. 3 is a basic schematic view of a modified embodiment.
Figure 4:
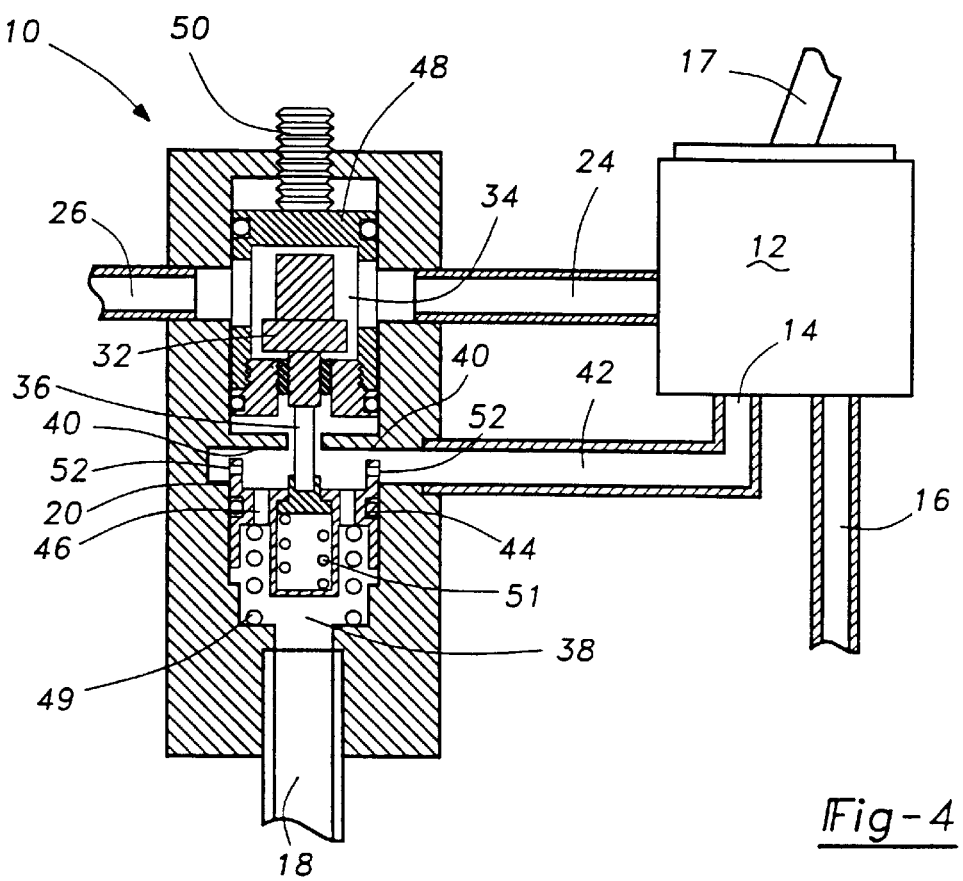
FIG. 4 is a side segmented view of a modified thermostatic faucet device using the schematic shown in FIG. 3.

A second embodiment of the thermostatic faucet 10 is shown in FIGS. 3 and 4. The same or similar parts are numbered the same as the corresponding parts of the first embodiment and are not further described. In this embodiment, the cold water inlet 14 is supplied solely by the conduit 42 that leads from the regulator and valve 20. The valve 20 has openings 52 with limited cross-section to provide a continuous albeit restricted supply of cold water. Thus, the mixer valve 12 has a continuous supply of cold water available through openings 52 even though the valve 20 may be in the closed position a positioned by the sensor 32. Again, this supply of cold water is necessary if the user desires to draw only cold water.

Alternatively, in place of openings 52, the valve 20 could have teeth that keep it slightly open from its seat 40. Another construction that obtains the same restricted and continuous supply of cold water is to dimension and arrange the valve 20 and sensor 32 such that valve 20 will always remain slightly spaced from its seat 40.

The operation of the second embodiment is the same as the first embodiment except for the fact that the continuous though restricted availability of cold water is through openings 52 rather than choke opening 21.

In the illustrations, the thermostatic regulator 30 is shown in a separate housing separate from the mixer valve 12; nevertheless, it is possible for the mixer valve 12 and the regulator 30 to be entirely or partly integrated with each other. The mechanical mixer 12 may be in the form of a cartridge and the thermostatic regulator can also be made in the form of a cartridge and the two respective cartridges can be housed in a single faucet body.

The mechanical mixer can be a ball valve or ceramic disk type of any kind. Referring now to FIG. 5, a plate type is shown to cooperate advantageously with thermostatic regulator 30. A fixed plate 60 is mounted within the faucet body and a mobile plate 62 is movable via an operable connection with control lever 17. The fixed plate has two openings 64 and 66 which lead to the hot water and cold water supply inlets 16 and 14. The mobile plate 62 has an opening 68 which correspond to openings 64 and 66. In FIG. 5, the opening 68 is shown as a peripheral cut. Rotational and translational movement of the mobile plate exposes the openings 64 and 66 in total amount and different proportions thus controlling both the flow rate and the mixing ratio between the hot and cold water. Commercially known progressive faucets with only rotation can also control the volume and mixing ratio.

The plates 60 and 62 also have respective apertures 70 and 72 that lead to regulator 30. The opening 72 in the mobile plate is sized and arranged to obstruct opening 70 when the mechanical mixer in the off position or also when the mixing valve is in the cold water only position. The control devices include the openings 70 and 72 thus separate the regulator 30 from the supply network when its action is not required. The cold water may then exit the faucet body via a separate opening with a pressure check valve to an outlet spout thereby bypassing the regulator sensor 32.

Variations and modifications are possible without departing from the scope and spirit of the present invention as defined by the appended claims.

The embodiments in which an exclusive property or privilege is claimed are defined as follows:

1. A thermostatic faucet mixing valve having a mechanical mixer valve having a first cold water supply conduit, a hot water supply conduit, and a mixed water outlet conduit; a thermostatic regulator having a sensor element in the mixed water outlet conduit and a control valve operably connected to the sensor; the improvement characterized by;

the control valve being located only in the first cold water supply conduit in a housing upstream from said mechanical mixer valve such that the thermostatic regulator modifies the flow of only the cold water exiting said housing that is provided to the mechanical mixer valve when the temperature of the mixed water down stream from said mechanical mixer becomes higher or lower than a set value as sensed by said sensor element;

said hot water supply conduit directly connected to said mechanical mixer parallel to said cold water supply conduit and bypassing the control valve in said housing.

2. A thermostatic faucet mixing valve as defined in claim 1 further characterized by;

said control valve having an full open position that provides for full water flow through said cold water conduit.

3. A thermostatic faucet mixing valve as defined in claim 2 further characterized by;

said control valve being constructed to completely close off said first cold water supply conduit;

a second cold water supply conduit is in parallel with said first cold water supply that supplies a restricted flow of cold water directly to said mechanical mixer valve.

4. A thermostatic faucet mixing valve as defined in claim 2 further characterized by;

said control valve is constructed to provide a continuous restricted flow of said cold water and not completely shut off cold water flow to said mechanical mixer in the absence of action by the sensor element.

5. A thermostatic faucet mixing valve as defined in claim 4 further characterized by;

said control valve having at least one passage of restricted area that allows said continuous restricted flow rate of said cold water through said control valve and to said mechanical valve.

6. A thermostatic faucet mixing valve as defined in claim 5 further characterized by;

said thermostatic regulator having a manual control to permit manual modification of the predetermined temperature that said control valve restricts flow through first cold water conduit.

7. A thermostatic faucet mixing valve as defined in claim 1 further characterized by;

said thermostatic regulator being in a separate housing from said mechanical mixer.

8. A thermostatic faucet mixing valve as defined in claim 1 further characterized by;

said set value being substantially above the temperature of said cold water supply such that said mixer valve can function to manually control the temperature mix of said hot and cold water supplies for mixed water below said set value.

* * * * *